US007255162B2

(12) United States Patent
Stevens et al.

(10) Patent No.: US 7,255,162 B2
(45) Date of Patent: Aug. 14, 2007

(54) METHODS AND APPARATUS FOR USE IN SUBTERRANEAN CEMENTING OPERATIONS

(75) Inventors: Michael D. Stevens, Duncan, OK (US); David D. Szarka, Duncan, OK (US); Kevin T. Berscheidt, Marlow, OK (US); Henry E. Rogers, Duncan, OK (US); Brett A. Fears, Duncan, OK (US)

(73) Assignee: Halliburton Energy Services, Inc., Duncan, OK (US)

( * ) Notice: Subject to any disclaimer, the term of this patent is extended or adjusted under 35 U.S.C. 154(b) by 430 days.

(21) Appl. No.: 10/841,772

(22) Filed: May 7, 2004

(65) Prior Publication Data

US 2005/0247458 A1    Nov. 10, 2005

(51) Int. Cl.
*E21B 33/13* (2006.01)
(52) U.S. Cl. .................. 166/75.15; 166/70; 166/77.4
(58) Field of Classification Search .............. 166/70, 166/75.15, 77.4, 291
See application file for complete search history.

(56) References Cited

U.S. PATENT DOCUMENTS

| | | | | |
|---|---|---|---|---|
| 4,427,065 A | * | 1/1984 | Watson | 166/250.04 |
| 4,674,573 A | * | 6/1987 | Bode | 166/291 |
| 5,170,853 A | * | 12/1992 | Mason et al. | 175/84 |
| 5,236,035 A | | 8/1993 | Brisco | 166/70 |
| 5,293,933 A | | 3/1994 | Brisco | 166/70 |
| 5,443,122 A | | 8/1995 | Brisco | |
| 5,890,537 A | | 4/1999 | Lavaure et al. | |
| 6,161,622 A | * | 12/2000 | Robb et al. | 166/386 |
| 6,302,140 B1 | | 10/2001 | Brisco | 137/268 |
| 6,360,769 B1 | | 3/2002 | Brisco | 137/268 |
| 6,517,125 B2 | | 2/2003 | Brisco | 285/363 |
| 6,672,384 B2 | | 1/2004 | Pedersen et al. | 166/75.15 |
| 2003/0024701 A1 | | 2/2003 | Simson | |
| 2004/0055741 A1 | | 3/2004 | Pedersen et al. | |

FOREIGN PATENT DOCUMENTS

| EP | 0 450 676 A1 | 10/1991 |
|---|---|---|
| EP | 0 905 349 A1 | 3/1999 |

OTHER PUBLICATIONS

Foreign communication from related counter part date Aug. 2, 2005.

(Continued)

*Primary Examiner*—William Neuder
*Assistant Examiner*—Nicole A Coy
(74) *Attorney, Agent, or Firm*—John W. Wustenberg; Baker Botts, L.L.P.

(57) ABSTRACT

The present invention relates to subterranean cementing operations, and more particularly to an apparatus useful in loading cementing plugs and darts into tubulars, and methods of using such apparatus in subterranean cementing operations. An example of a method of the present invention is a method of placing a compressible object having a cross-section within a tubular, including the steps of: reducing the cross-section of the compressible object; placing the compressible object with the reduced cross-section in a tubular; and releasing the compressible object within the tubular. Another example of a method of the present invention is a method of reducing the radial cross-section of a compressible object. Other examples of apparatus of the present invention include apparatus for placing a compressible object into a tubular.

42 Claims, 13 Drawing Sheets

OTHER PUBLICATIONS

U.S. Appl. No. 10/714,831, filed Nov. 14, 2003, Entitled "Molded Foam Plugs, Plug Systems and Methods of Using Same," by Michael D. Stevens et al.

U.S. Appl. No. 10/714,832, filed Nov. 14, 2003, Entitled "Compressible Darts and Methods for Using These Darts in Subterranean Wells," by David D. Szarka.

* cited by examiner

METHODS AND APPARATUS FOR USE IN SUBTERRANEAN CEMENTING OPERATIONS

BACKGROUND

The present invention relates to subterranean cementing operations, and more particularly to an apparatus useful in loading cementing plugs and darts into tubulars, and methods of using such apparatus in subterranean cementing operations.

Cementing operations may be conducted in a subterranean formation for many reasons. For instance, after (or, in some cases, during) the drilling of a well bore within a subterranean formation, pipe strings such as casings and liners are often cemented in the well bore. This usually occurs by pumping a cement composition into an annular space between the walls of the well bore and the exterior surface of the pipe string disposed therein. Generally, the cement composition is pumped down into the well bore through the pipe string, and up into the annular space. Prior to the placement of the cement composition into the well bore, the well bore is usually full of fluid, e.g., a drilling or circulation fluid. Oftentimes, an apparatus known as a cementing plug may be employed and placed in the fluid ahead of the cement composition to separate the cement composition from the well fluid as the cement slurry is placed in the well bore, and to wipe fluid from the inner surface of the pipe string while the cementing plug travels through it. An apparatus known as a dart also may be used, inter alia, to facilitate deployment of cementing plugs within the well bore, e.g., by contacting a cementing plug in a manner that separates (e.g., shears) a frangible connection holding the cementing plug in place, thereby freeing the cementing plug to travel along the well bore. Other objects (e.g., a ball) also may be used for these and similar purposes. Once placed in the annular space, the cement composition is permitted to set therein, thereby forming an annular sheath of hardened substantially impermeable cement that substantially supports and positions the pipe string in the well bore and bonds the exterior surface of the pipe string to the walls of the well bore.

Conventional methods of placing a cementing plug or dart in a well bore typically involve loading the cementing plug or dart into a tubular, such as the pipe string or a cementing head, either of which may have a cross-sectional area that is smaller than the maximum cross-sectional area of the cementing plug or dart. Commonly, the cementing plug or dart is forced into the tubular by hand until the cementing plug or dart can no longer be moved by hand. Subsequently, an operator may use, e.g., a sledge hammer and rod to further load the cementing plug or dart into the desired position. This may be problematic because it may create safety concerns for the operator, delay the placement in the well bore of the cementing plug or dart (and, consequently, the cement composition), and damage the cementing plug or dart itself.

SUMMARY

The present invention relates to subterranean cementing operations, and more particularly to an apparatus useful in loading cementing plugs and darts into tubulars, and methods of using such apparatus in subterranean cementing operations.

An example of a method of the present invention is a method of placing a compressible object having a cross-section within a tubular, comprising the steps of: reducing the cross-section of the compressible object; placing the compressible object with the reduced cross-section in a cementing head; and releasing the compressible object within the tubular.

Another example of a method of the present invention is a method of reducing the cross-section of a compressible object, comprising applying a differential pressure to displace the compressible object from within a loading chamber having a first cross-section into a holding chamber having a second cross-section, wherein the loading chamber is in fluid communication with the holding chamber, and wherein the first cross-section is greater than the second cross-section.

An example of an apparatus of the present invention is an apparatus for placing a compressible object into a tubular, comprising: a loading chamber having an inner cross-section; a holding chamber having an inner cross-section, and in fluid communication with the loading chamber; a fluid inlet attached to the loading chamber; and a fluid outlet attached to the holding chamber; wherein the inner cross-section of the holding chamber is less than the inner cross-section of the loading chamber.

Another example of an apparatus of the present invention is an apparatus for placing a compressible object into a tubular, comprising: a loading chamber having an inner cross-section; a holding chamber having an inner cross-section, and in fluid connection with the loading chamber; a piston; an inlet attached to the loading chamber; and an outlet attached to the holding chamber; wherein: the inner cross-section of the holding chamber is less than the inner cross-section of the loading chamber; and the piston is disposed within the apparatus such that it may be raised and lowered within the loading chamber and the holding chamber.

The features and advantages of the present invention will be readily apparent to those skilled in the art upon a reading of the description of the exemplary embodiments that follows.

BRIEF DESCRIPTION OF THE DRAWINGS

A more complete understanding of the present disclosure and advantages thereof may be acquired by referring to the following description taken in conjunction with the accompanying drawings, wherein.

Figure 1:
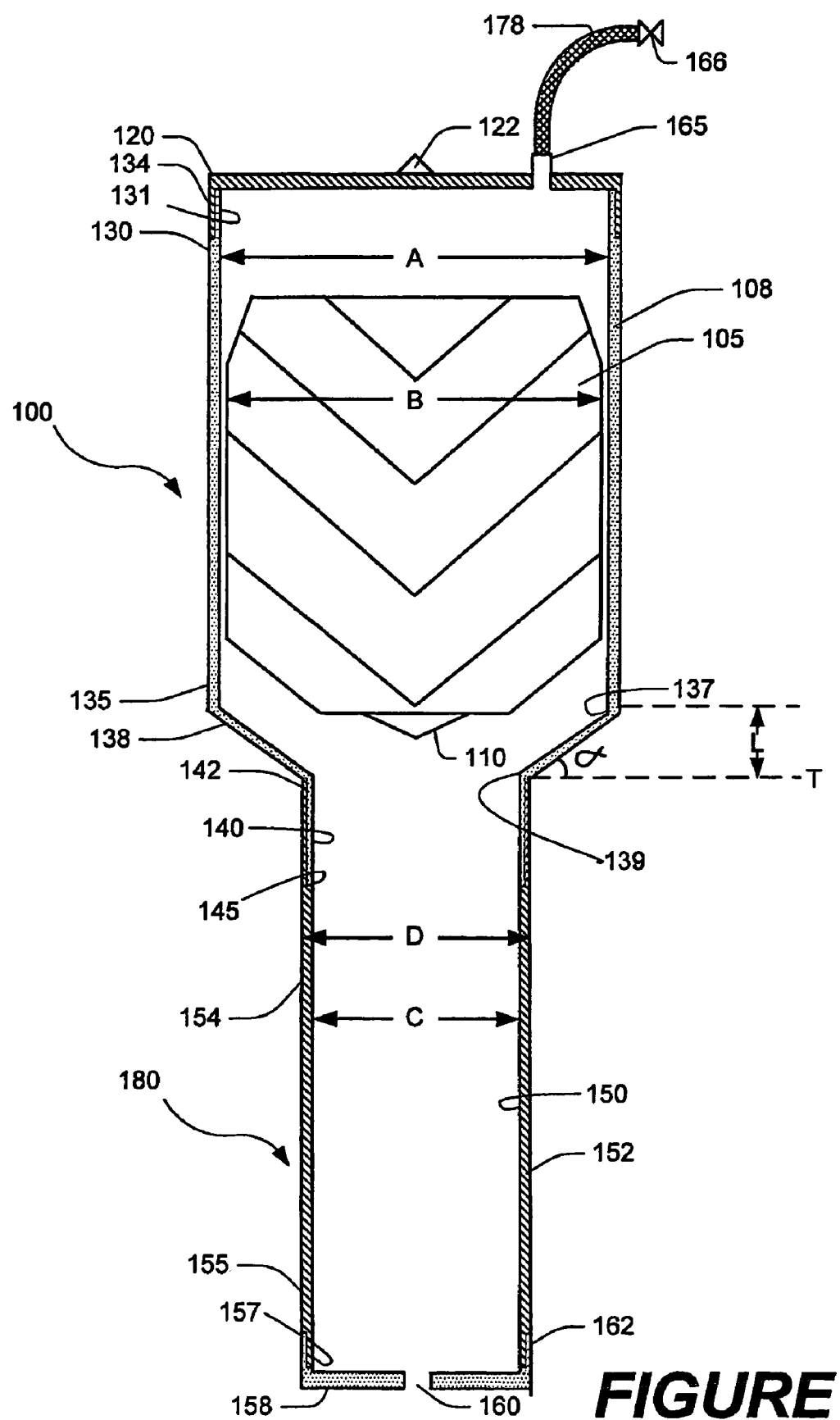
FIG. 1 illustrates an exemplary embodiment of an apparatus of the present invention.

While the present invention is susceptible to various modifications and alternative forms, specific exemplary embodiments thereof have been shown in the drawings and are herein described. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION

The present invention relates to subterranean cementing operations, and more particularly to an apparatus useful in loading cementing plugs and darts into tubulars, and methods of using such apparatus in subterranean cementing operations.

A broad variety of compressible objects having a broad range of cross-sections may be used in accordance with the present invention. Generally, these compressible objects may have a maximum cross-section in the range of from about 2 inches to about 36 inches; in certain exemplary embodiments of the present invention, compressible objects having a maximum cross-section greater than about 36 inches also may be used. In certain exemplary embodiments of the present invention, the compressible object may be a ball, a cementing plug, or a dart. A variety of cementing plugs or darts may be suitable for use with the present invention, including, but not limited to, cementing plugs or darts that comprise an elastomeric body and/or an elastomeric outer cover, and those that comprise an open-cell foam body. In certain exemplary embodiments, the cementing plug or dart may comprise an open-cell foam body.

Referring to FIG. 1, a loading chamber is denoted generally at 100. The loading chamber 100 comprises a shell portion 108 and a tapered portion 138. Shell portion 108 generally is a hollow shell that can have any suitable shape; in certain exemplary embodiments, shell portion 108 may have a cylindrical shape. Generally, loading chamber 100 comprises a one-piece construction; e.g., shell portion 108 and tapered portion 138 are a unitary piece. Loading chamber 100 may be made from a variety of materials, including, but not limited to, aluminum, carbon steel, stainless steel, plastic, and a fiberglass composite. In certain exemplary embodiments, loading chamber 100 is made from aluminum. In certain exemplary embodiments, loading chamber 100 may have a wall thickness of about ¼ inch. Shell portion 108 generally will have an inner cross-section A that closely approximates a maximum cross-section B of a cementing plug or dart 105. For example, if an operator desires to load a cementing plug or dart 105 having a maximum cross-section B of about 6 inches, then the inner cross-section A of shell portion 108 may be about 6.25 inches. In certain of such embodiments, the outer cross-section of shell portion 108 may be about 6.75 inches.

Loading chamber head 120 is attached to an upper end 130 of loading chamber 100. In certain exemplary embodiments, loading chamber head 120 may be threadably attached to upper end 130. In certain of such exemplary embodiments, loading chamber head 120 comprises female threads 134, and upper end 130 comprises male threads 131. Loading chamber head 120 further comprises lifting device 122. In certain exemplary embodiments, lifting device 122 simply may comprise one or more lugs having holes defined therethrough for receiving a connection by which the loading chamber 100 may be lifted. Loading chamber head 120 further comprises port 165. In certain exemplary embodiments, port 165 may be a ¼" NPT threaded opening that has been formed within loading chamber head 120. Optionally, in certain exemplary embodiments of the methods of the present invention wherein an operator elects to use fluid pressure to displace cementing plug or dart 105 from loading chamber 100 into holding chamber 180 (e.g., the exemplary methods set forth in FIGS. 6, 7, and 12), an operator may connect fluid supply 178 and valve 166 to port 165 as illustrated in FIG. 1.

Loading chamber 100 comprises tapered portion 138. Tapered portion 138 has length L, and comprises a major bore 137 and a minor bore 139. Major bore 137 is located adjacent a lower end 135 of shell portion 108. Angle α is defined by tangent T and length L, and may be in the range of from about 5 degrees to about 90 degrees, with 90 degrees comprising a square shoulder. In certain exemplary embodiments, major bore 137 has a cross-section of about 6.25 inches, and minor bore 139 has a cross-section of about 3.227 inches.

Loading chamber 100 may be attached to holding chamber 180, so as to facilitate the compression of the cross-sectional area of cementing plug or dart 105. Loading chamber 100 and holding chamber 180 may be attached in a variety of ways. For example, in certain exemplary embodiments of the present invention wherein an operator does not desire to disconnect loading chamber 100 from holding chamber 180 before placing holding chamber 180 in a tubular 400 (e.g., the exemplary method set forth in FIG. 12), loading chamber 100 and holding chamber 180 may be permanently connected, e.g., welded together, or formed as part of a single piece. In certain exemplary embodiments of the present invention wherein an operator does desire to disconnect loading chamber 100 from holding chamber 180 before placing holding chamber 180 in a tubular 400 (e.g., the exemplary method set forth in FIG. 5, for example), loading chamber 100 and holding chamber 180 may be connected by an impermanent connection, (e.g., any connection that later may be taken apart). For example, loading chamber 100 and holding chamber 180 may be connected by a snap-ring connection, or by any suitable impermanent connection, including, but not limited to, a threaded connection. In certain exemplary embodiments wherein loading chamber 100 and holding chamber 180 are connected by a threaded connection, loading chamber 100 may comprise threaded portion 140, holding chamber 180 may comprise threaded portion 142 adjacent an upper end 145 of holding chamber 180, and loading chamber 100 may be threadably attached to holding chamber 180 by threadably attaching threaded portion 140 to threaded portion 142. In certain exemplary embodiments, threaded portion 140 may be externally threaded, and threaded portion 142 may be internally threaded. In certain exemplary embodiments, threaded portion 140 may comprise 6-stub ACME external threads having a maximum outer diameter of about 3.5 inches.

Holding chamber 180 further comprises shell portion 152. Shell portion 152 generally is a hollow shell that can have any suitable shape; in certain exemplary embodiments, shell portion 152 may be cylindrical in shape. Shell portion 152 has an inner surface 150 and an outer surface 154, and has a cross-section C. In certain exemplary embodiments of the present invention, cross-section C may range from about 1.5 inches to about 36 inches; in certain exemplary embodiments of the present invention, cross-section C may be greater than about 36 inches. In certain exemplary embodiments, shell portion 152 may have a thickness of about ¼ inch. Shell portion 152 has a cross-section D that closely approximates a cross-section E of a tubular 400 (not shown in FIG. 1), such as a pipe string or a cementing head. For example, if an operator desires to load a cementing plug or dart 105 into a tubular 400 having a cross-section E of about 4 inches, then cross-section D of holding chamber 180 may be about 3.75 inches. In certain of such embodiments, the cross-section C of shell portion 152 may be about 3.25 inches.

Holding chamber 180 further comprises a lower end 155. In certain exemplary embodiments, threaded portion 157 may be disposed adjacent lower end 155. Threaded portion 157 may be external or internal. Cap 158 is attached to holding chamber 180 adjacent lower end 155. Cap 158 generally comprises a plug body having threads 162 and opening 160 defined through its center. Threads 162 may be external or internal. In certain exemplary embodiments, cap 158 comprises an internally-threaded bull plug with an opening 160 defined through its center. Generally, opening 160 has any cross-section that is suitable to permit a desired rate of fluid flow to exit holding chamber 180, and that is smaller than the cross-section of a solid portion of cementing plug or dart 105, e.g., smaller than solid nose 110 of cementing plug or dart 105. In certain exemplary embodiments, the cross-section of opening 160 may range from about ⅛ inch to about 3 inches. Cap 158 may be attached to holding chamber 180 by any suitable means, e.g., by threadably attaching threads 162 of cap 158 to threaded portion 157 of holding chamber 180.

Figure 2:
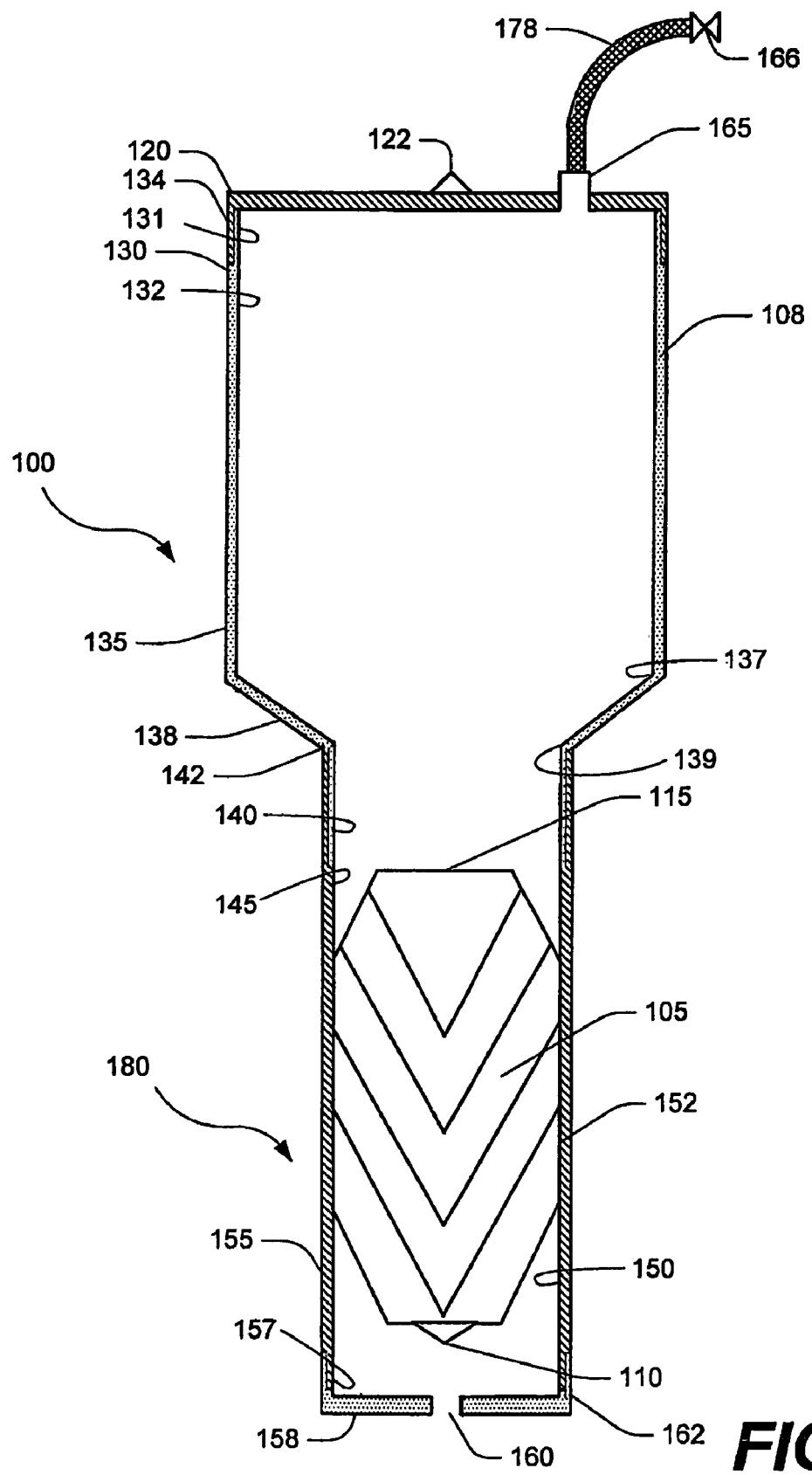
FIG. 2 illustrates another exemplary embodiment of an apparatus of the present invention.

Referring now to FIG. 2, cementing plug or dart 105, having been displaced from loading chamber 100 according to the methods of the present invention, is shown within holding chamber 180.

FIGS. 3 through 5, and 13 pertain to certain exemplary embodiments of the present invention wherein loading chamber 100 and holding chamber 180 may be separated from each other following the displacement of cementing plug or dart 105 from loading chamber 100 into holding chamber 180. Optionally, in certain exemplary embodiments, an operator may choose not to separate loading chamber 100 and holding chamber 180 from each other following the displacement of cementing plug or dart 105 from loading chamber 100 into holding chamber 180; such exemplary embodiments are described further with reference to FIG. 12, which depicts an exemplary method by which such exemplary embodiments may be used in accordance with the present invention.

Figure 3:
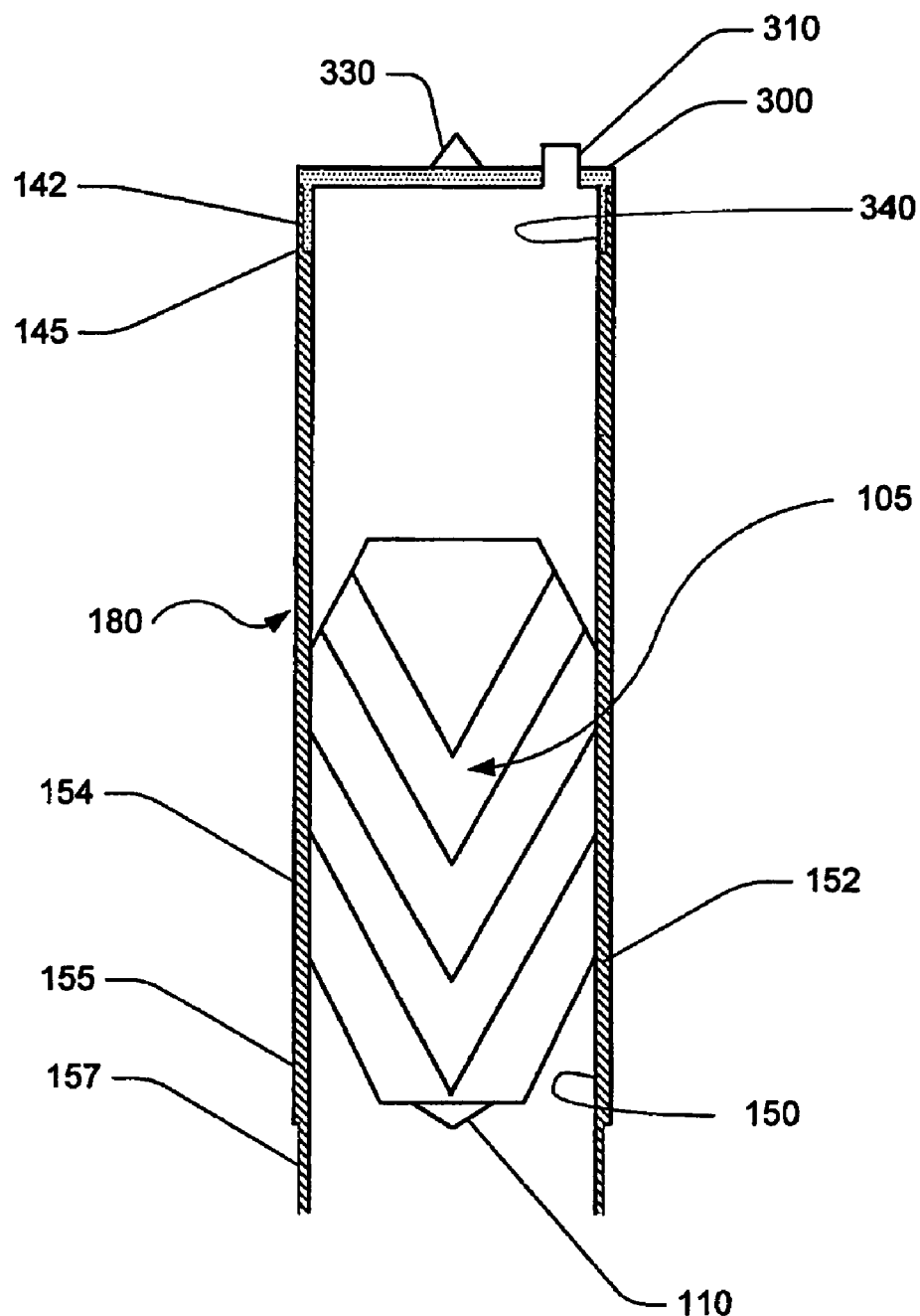
FIG. 3 illustrates still another exemplary embodiment of an apparatus of the present invention.

Referring now to FIG. 3, in certain exemplary embodiments of the present invention wherein an operator may elect to separate loading chamber 100 and holding chamber 180 from each other following the displacement of cementing plug or dart 105 from loading chamber 100 into holding chamber 180, an operator may detach tapered portion 138 and loading chamber 100 from holding chamber 180, and may remove cap 158 and attach holding chamber head 300. Holding chamber head 300 generally comprises threaded portion 340, which may threadably attach to threaded portion 142 of holding chamber 180, such that holding chamber head 300 may be attached to holding chamber 180. Holding chamber head 300 further comprises lifting device 330. In certain exemplary embodiments, lifting device 330 may simply comprise lugs having holes defined therethrough for receiving a connection by which the holding chamber head 300 (and holding chamber 180, when it is attached to holding chamber head 300) may be lifted. Holding chamber head 300 further comprises port 310. In certain exemplary embodiments, port 310 is a ¼" NPT threaded opening that has been formed within holding chamber head 300.

Figure 4:
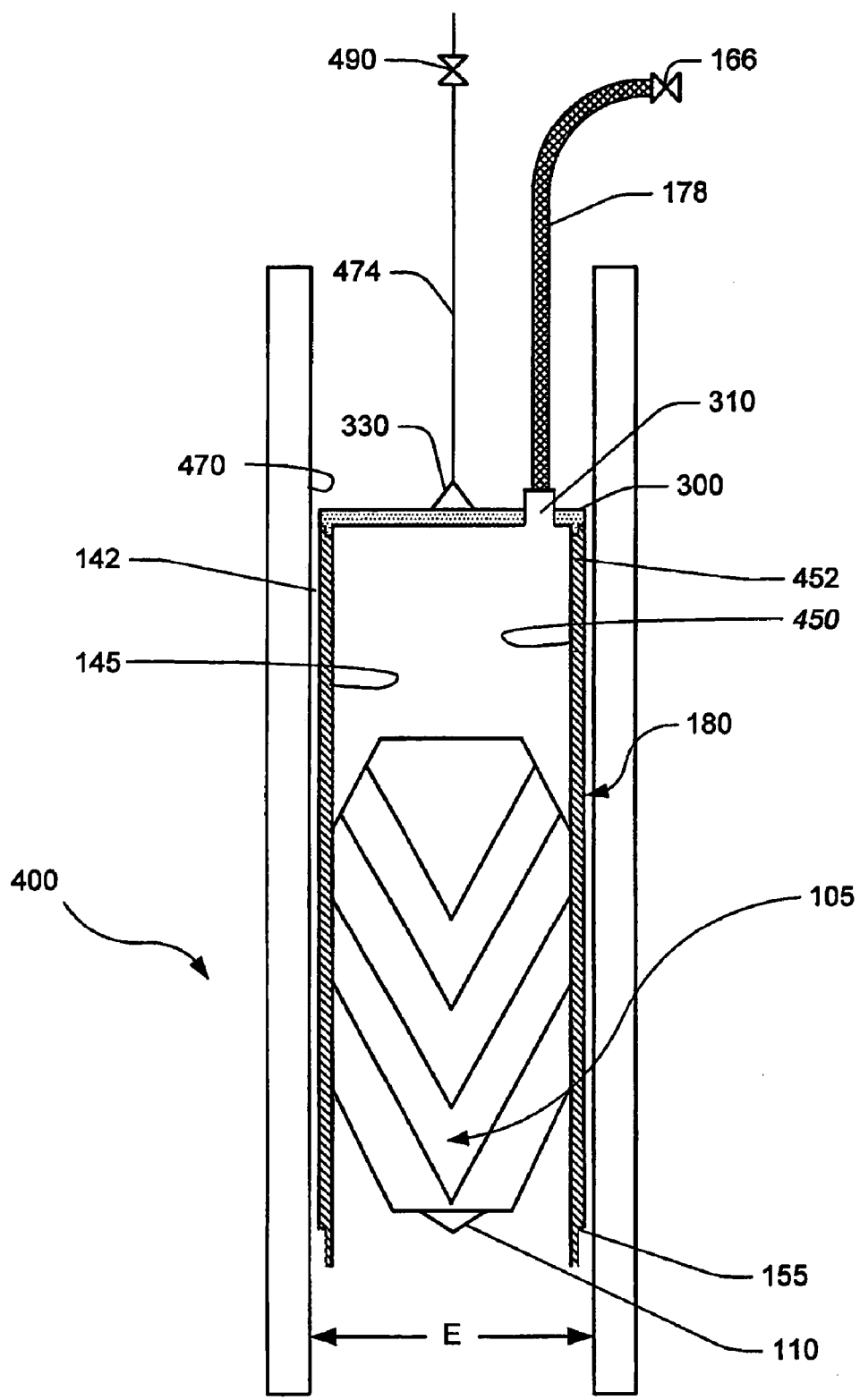
FIG. 4 illustrates yet another exemplary embodiment of an apparatus of the present invention.

Referring now to FIG. 4, holding chamber 180 is shown suspended within tubular 400. A broad variety of tubulars may be suitable for use in accordance with the present invention, including, inter alia, a pipe string or a cementing head. A wide variety of cementing heads may be suitable for use in the present invention. Examples of such suitable cementing heads may be found, for example, in U.S. Pat. No. 6,517,125, the relevant disclosure of which is incorporated herein by reference. In certain exemplary embodiments wherein tubular 400 is a cementing head, tubular 400 may comprise multiple internal valves (not shown), e.g., a lower valve, at least one middle valve, and an upper valve. In certain exemplary embodiments, such internal valves within tubular 400 may be rotating canister valves. In certain other exemplary embodiments wherein tubular 400 is a cementing head, tubular 400 may comprise a plunger assembly (not shown) having the capability of individually segregating multiple cementing plugs or darts. An example of such cementing head may be found, for example, in U.S. Pat. Nos. 5,236,035, and 5,293,933, the relevant disclosures of which are incorporated herein by reference.

Transporting means 474 is connected to lifting device 330. In certain exemplary embodiments, transporting means 474 may be a wire, cable or solid rod having a tensile strength of at least about 250 pounds; in certain exemplary embodiments, transporting means 474 may be a wire, cable or solid rod having a tensile strength of at least about 1,000 pounds, or greater, in certain exemplary embodiments. In certain exemplary embodiments, transporting means 474 may be a hollow pipe that is suitably strong for raising and lowering holding chamber 180 within tubular 400, and that has a cross-section that is suitable for permitting a desired flow of fluid into holding chamber 180. In certain exemplary embodiments wherein tubular 400 is disposed horizontally rather than vertically, transporting means 474 may be a hollow pipe that is suitably strong for moving holding chamber 180 forwards and backwards within tubular 400, and that has a suitable cross-section for permitting a desired flow of fluid into holding chamber 180. In certain exemplary embodiments, transporting means 474 comprises ¼" pipe that has been threadably attached to holding chamber head 300. In certain exemplary embodiments wherein transporting means 474 comprises a hollow pipe having a cross-section that is suitable for permitting a desired flow of fluid into holding chamber 180, lifting device 330 may be selected so as to permit fluid communication from transporting means 474 into holding chamber 180 (for example, lifting device 330 may be a thread-o-let or weld-o-let (not shown)). An operator may elect to employ a pipe or solid rod as transporting means 474 rather than a wire or cable in circumstances such as those where tubular 400 may have obstructions that impede insertion into and/or retrieval therefrom of holding chamber 180; holding chamber 180 may require the application of force to successfully navigate past such obstructions, for which the use of a pipe or solid rod as transporting means 474 may more successfully impart the desired force. Where transporting means 474 comprises a pipe, an operator may convey a fluid such as air, water, or the like through transporting means 474 and into holding chamber 180 when the operator desires to use such fluid to displace cementing plug or dart 105 from holding chamber 180 into tubular 400. Where transporting means 474 comprises a wire, cable or solid rod, an operator may elect to convey the fluid into holding chamber 180 through fluid supply 178, shown connected to port 310. A remotely located valve (e.g., valve 166 or valve 490) may permit the operator to control the flow of fluid into holding chamber 180. In certain exemplary embodiments, the fluid conveyed may be a gas (e.g., air, carbon dioxide or nitrogen) supplied at a pressure in the range of from about 120 psi to about 150 psi.

Figure 5:
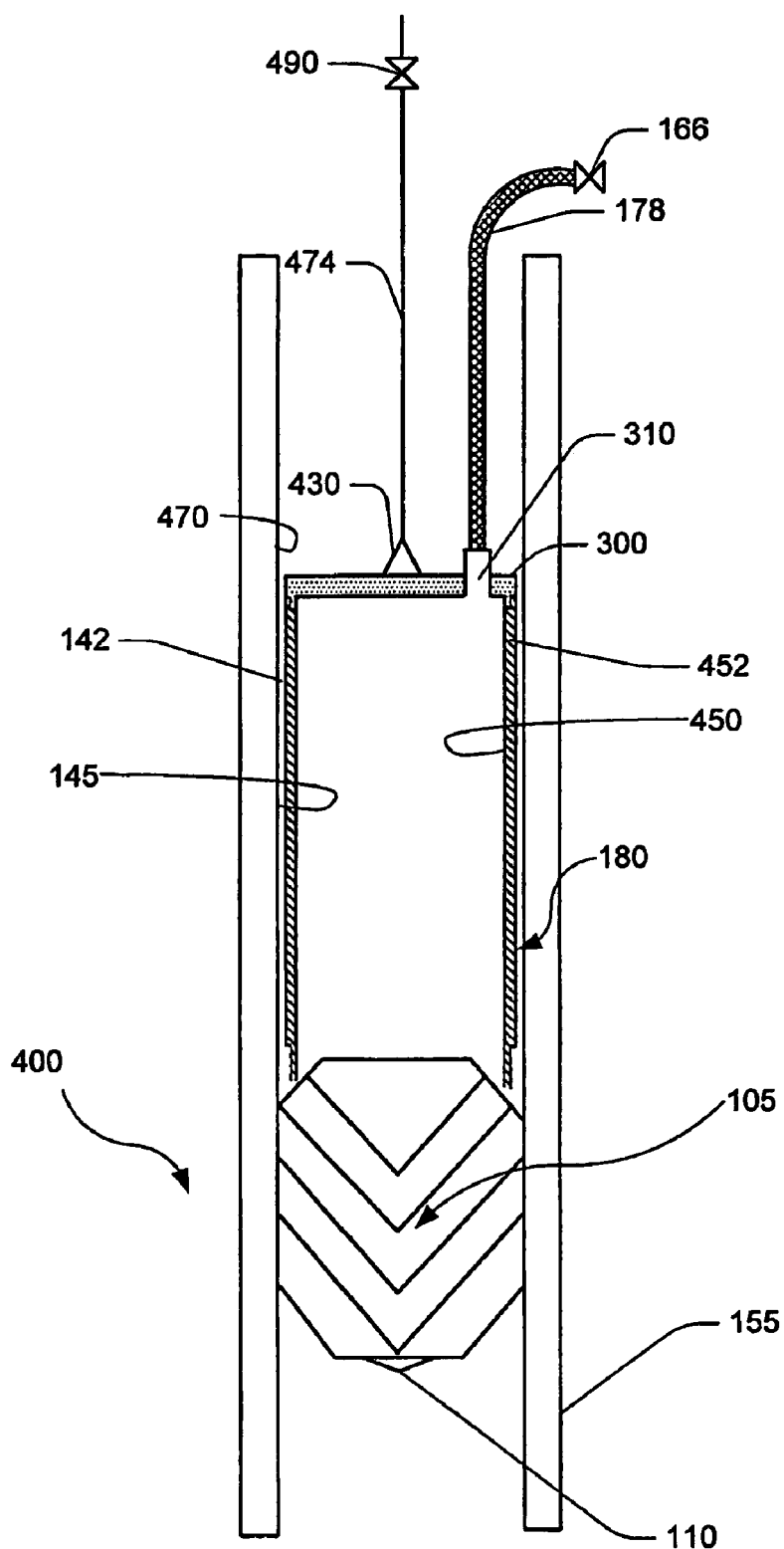
FIG. 5 illustrates yet another exemplary embodiment of an apparatus of the present invention.

Referring now to FIG. 5, cementing plug or dart 105, having been displaced from within holding chamber 180, is shown disposed within tubular 400, in interference fit with inner wall 470. Holding chamber 180 is shown being retracted from within tubular 400 by transporting means 474.

Figure 13:
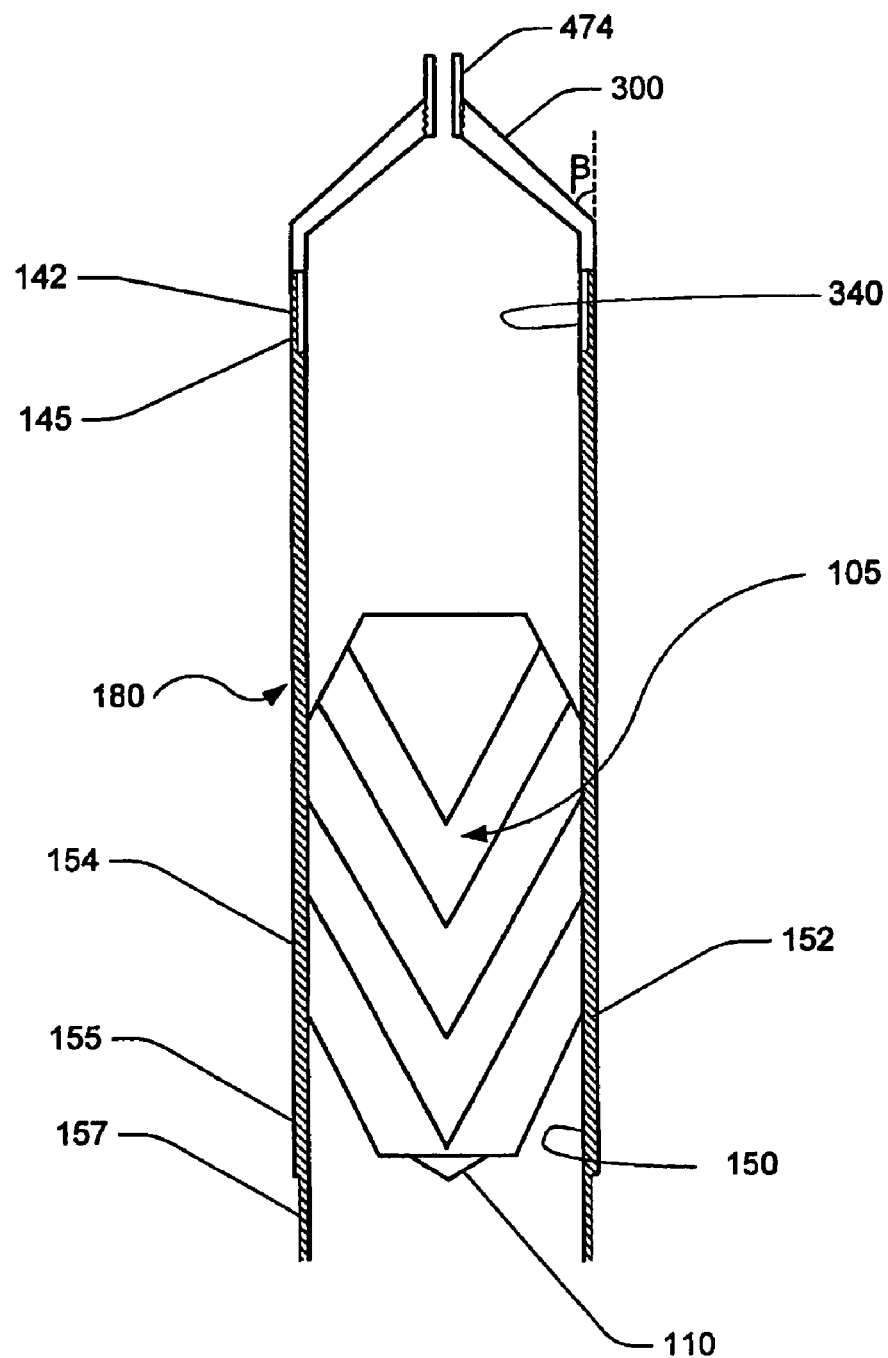
FIG. 13 illustrates yet another exemplary embodiment of an apparatus of the present invention.

Referring now to FIG. 13, illustrated therein is an exemplary holding chamber head 300 having a tapered surface that may be attached to holding chamber 180. Such exemplary holding chamber head 300 having a tapered surface may be suitable for a wide variety of applications. In certain exemplary embodiments, including, but not limited to, those where holding chamber 180 is to be placed within a tubular having an internal configuration that may impair removal of holding chamber therefrom, an operator may elect to attach such exemplary holding chamber head 300 having a tapered surface to holding chamber 180 to facilitate, inter alia, the removal of holding chamber 180 from the tubular. In certain exemplary embodiments wherein an operator elects to employ holding chamber head 300 having a tapered surface, the surface of holding chamber head 300 may taper from vertical at an angle β in the range of from about 5 degrees to about 45 degrees. In certain exemplary embodiments, the surface of holding chamber head 300 may taper from vertical at an angle β in the range of from about 5 degrees to about 15 degrees. In the exemplary embodiment illustrated in FIG. 13, holding chamber head 300 has a tapered surface, and is connected to transporting means 474. Where transporting means 474 comprises a pipe, an operator may convey a fluid such as air, water, or the like through transporting means 474 and into holding chamber 180 when the operator desires to use such fluid to displace cementing plug or dart 105 from holding chamber 180 into tubular 400. Where transporting means 474 comprises a wire, cable or solid rod, and is connected to an exemplary embodiment of holding chamber head 300 that has a tapered surface, an operator may elect to convey the fluid into holding chamber 180 through a fluid supply 178 (not shown) that may be connected to a port 310 (not shown) on holding chamber head 300.

Figure 6:
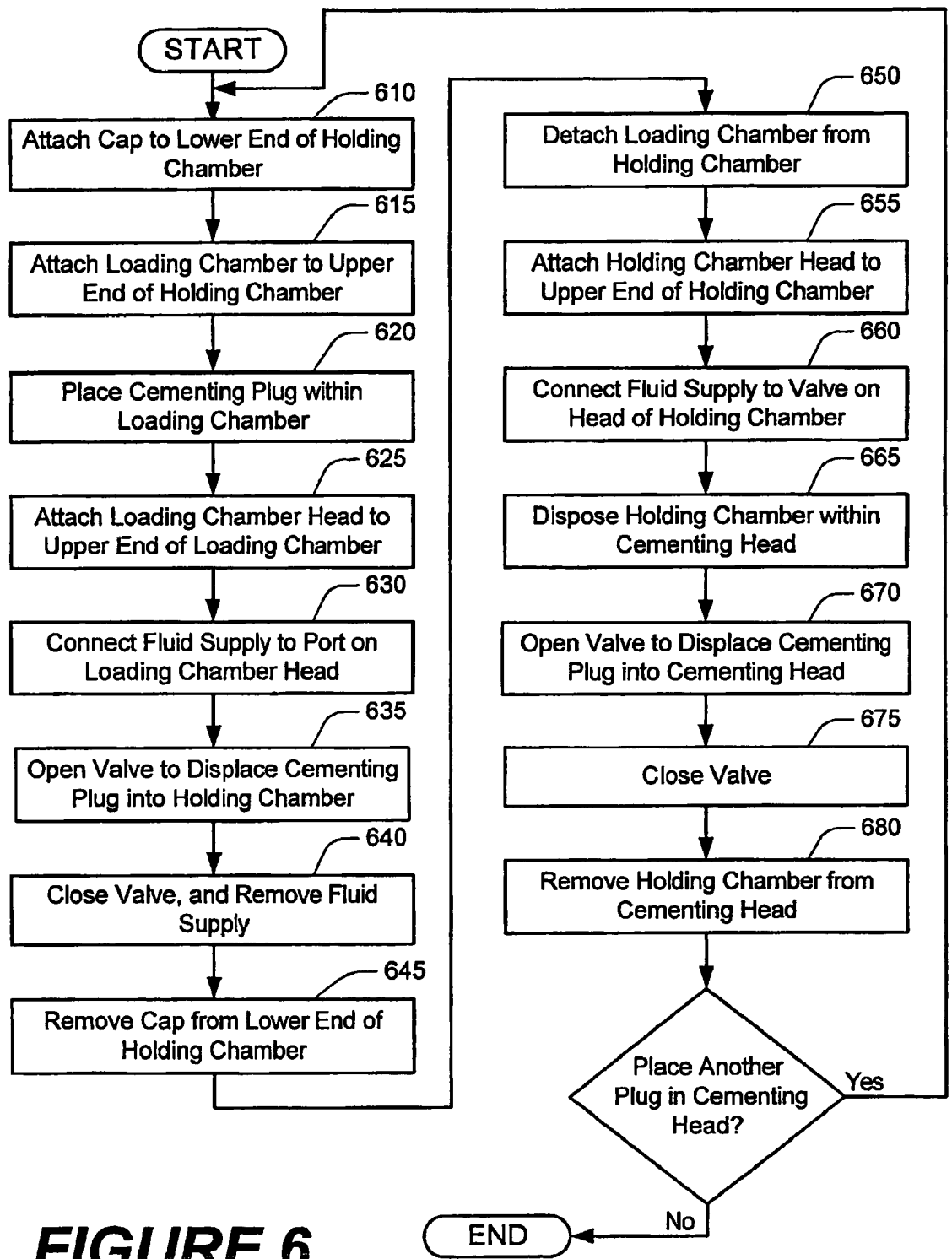
FIG. 6 is a flowchart illustrating an exemplary method of the present invention.

FIG. 6 illustrates an exemplary embodiment of a method of the present invention; reference occasionally will be made to elements which appear in FIGS. 1-5. The exemplary method illustrated in FIG. 6 may be particularly suitable for application in which an operator desires to separate loading chamber 100 from holding chamber 180 before placing holding chamber 180 within tubular 400 (as opposed to permitting holding chamber 180 and loading chamber 100 to remain connected before placing holding chamber 180 within tubular 400). Though FIG. 6 often refers to a cementing plug or dart 105, it will be understood that in certain exemplary embodiments, other compressible objects (e.g., a ball) also may be used in the manner described herein. In step 610, an operator attaches a cap 158 to a lower end 155 of a holding chamber 180. In step 615, a loading chamber 100 is attached to an upper end 145 of the holding chamber 180. In step 620, a cementing plug or dart 105 is placed within the loading chamber 100. Optionally, the cementing plug or dart 105 may be greased or otherwise lubricated before placement within the loading chamber 100. Optionally, an operator may elect to pre-soak the cementing plug or dart 105 in a liquid (e.g., water) before placing the cementing plug within the loading chamber 100. This may be particularly useful in certain exemplary embodiments wherein cementing plug or dart 105 comprises an open-cell foam body, which more readily may permit the passage of a gas (e.g., air) therethrough, which may reduce the rate at which cementing plug or dart 105 may be conveyed into holding chamber 180; by pre-soaking such cementing plug or dart 105 in a liquid, the operator may succeed in reducing the rate at which the gas may pass through cementing plug or dart 105, thereby increasing the rate at which cementing plug or dart 105 may be conveyed into holding chamber 180. In step 625, a loading chamber head 120 is attached to an upper end 130 of the loading chamber 100. In step 630, a fluid supply 178 may be connected to a port 165 on the loading chamber head 120. In certain exemplary embodiments, the fluid supply 178 may be a hose through which air, nitrogen, or water may be supplied to the loading chamber head 120. In step 635, a valve 166 in fluid connection with fluid supply 178 is opened to displace the cementing plug or dart 105 into the holding chamber 180. Opening the valve 166 permits fluid to flow into the loading chamber 100 and act against a cross-sectional area of the cementing plug or dart 105 to thereby displace the cementing plug or dart 105 into the holding chamber 180. In certain exemplary embodiments where the fluid supply 178 comprises a gas (e.g., compressed air), and where the cementing plug or dart 105 has not been pre-soaked with liquid, the time required to displace the cementing plug or dart 105 into the holding chamber 180 may be about 10 minutes. In certain exemplary embodiments wherein the cementing plug or dart 105 has been pre-soaked with liquid before its placement in the loading chamber 100, the cementing plug or dart 105 may be displaced into the holding chamber 180 in a greatly reduced time (e.g., about 30 seconds to one minute). Any fluid that may seep around the cementing plug or dart 105 flows into the holding chamber 180 and exits through the opening 160 in the cap 158 adjacent the lower end 155 of the holding chamber 180. In step 640, the valve 166 is closed, and the fluid supply 178 is removed from port 165. In step 645, the cap 158 is removed from the lower end 155 of the holding chamber 180. In step 650, the loading chamber 100 is detached from the holding chamber 180. In step 655, a holding chamber head 300 is attached to an upper end 145 of the holding chamber 180. In certain exemplary embodiments, the holding chamber head 300 comprises threaded portion 340 that is incompatible with 157 at a lower end 155 of the holding chamber 180, so as to minimize the risk that an operator may inadvertently threadably attach the holding chamber head 300 to the lower end 155 of the holding chamber 180 instead of the upper end 145 of the holding chamber 180. For example, in certain exemplary embodiments, both the holding chamber head 300 and the lower end 155 of the holding chamber 180 may comprise external threads, while the upper end 145 of the holding chamber 180 comprises threaded portion 142, so that the holding chamber head 300 may be threadably attached to only the upper end 145 of the holding chamber 180. In step 660, the operator connects a fluid supply to holding chamber head 300, which may comprise, among other things, attaching fluid supply 178 to port 310, or connecting a source of fluid to transporting means 474 in embodiments where transporting means 474 comprises a pipe, and attaching transporting means 474 to a lifting device 430 atop holding chamber head 300. In step 665, the holding chamber 180 is disposed within a tubular 400. In certain exemplary embodiments, an operator may dispose the holding chamber 180 within the tubular 400 through the use of transporting means 474 that has been connected to a lifting device 330 atop the holding chamber head 300, e.g., the operator may connect transporting means 474 to a crane (not shown), then transport holding chamber 180 to the tubular 400 and place the holding chamber 180 into the tubular 400. In certain exemplary embodiments wherein tubular 400 is a cementing head that comprises multiple internal valves, the step of placing the holding chamber 180 into the tubular 400 may comprise introducing the holding chamber 180 through at least one internal valve within the cementing head, and shouldering off atop or against an internal valve into which the operator desires to place the cementing plug or dart 105. In certain exemplary embodiments wherein tubular 400 is a cementing head that comprises a plunger assembly capable of individually segregating multiple cementing plugs or darts, the step of placing the holding chamber 180 into the tubular 400 may comprise introducing the holding chamber 180 into the cementing head until it shoulders off on, or against the plunger. In step 670, valve 166 (generally located remotely from holding chamber head 300) is opened to displace the cementing plug or dart 105 into the tubular 400. In step 675, the valve 166 is closed and the fluid supply is disconnected. In step 680, the holding chamber 180 is removed from the tubular 400. If the operator does not desire to place another cementing plug or dart 105 within tubular 400, the process proceeds to end. In certain exemplary embodiments wherein an operator desires to place multiple cementing plugs or darts 105 within tubular 400, the process may return to step 610, and repeat the process until the desired number of cementing plugs or darts 105 have been placed within tubular 400, after which the process proceeds to end.

Figure 7:
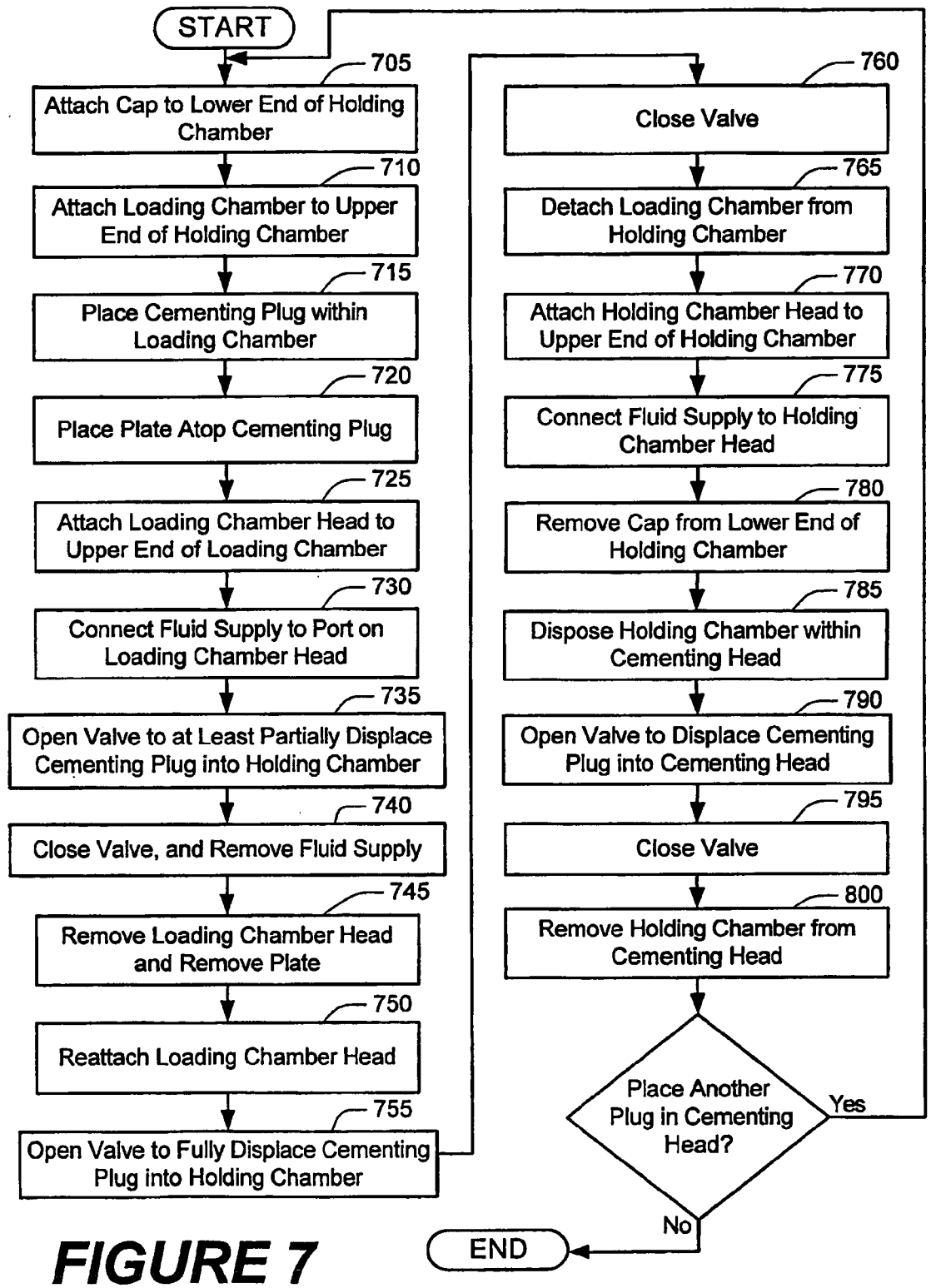
FIG. 7 is a flowchart illustrating another exemplary method of the present invention.

FIG. 7 illustrates another exemplary embodiment of a method of the present invention. The exemplary method illustrated in FIG. 7 may be particularly suitable for application in which an operator desires to separate loading chamber 100 from holding chamber 180 before placing holding chamber 180 within tubular 400 (as opposed to permitting holding chamber 180 and loading chamber 100 to remain connected before placing holding chamber 180 within tubular 400). Though FIG. 7 often refers to a cementing plug or dart 105, it will be understood that in certain exemplary embodiments, other compressible objects (e.g., a ball) also may be used in the manner described herein. In step 705, an operator attaches a cap 158 to a lower end 155 of a holding chamber 180. In step 710, a loading chamber 100 is attached to an upper end 145 of the holding chamber 180. In step 715, a cementing plug or dart 105 is placed within the loading chamber 100. In step 720, a plate (e.g., a diaphragm made of rubber, a piston, or any object that is impermeable to fluid flow) having a cross-section that approximates the inner cross-section 132 of the loading chamber 100 is placed atop the cementing plug or dart 105 within the loading chamber 100. The placement of a plate atop the cementing plug or dart 105 may minimize the seepage of fluid around the cementing plug or dart 105 as well as the absorption of fluid within the cementing plug or dart 105 during step 735, infra, wherein fluid is supplied into the loading chamber 100 so as to at least partially displace the cementing plug or dart 105 into the holding chamber 180, because the fluid will tend to act against the plate (thereby displacing both the plate and the cementing plug or dart 105 towards the holding chamber 180) as opposed to seeping around the cementing plug or dart 105 or becoming absorbed within the cementing plug or dart 105. In step 725, a loading chamber head 120 is attached to an upper end 130 of the loading chamber 100. In step 730, a fluid supply 478 is connected to a port 165 on the loading chamber head 120. In step 735, a valve 166 is opened to at least partially displace the cementing plug or dart 105 into the holding chamber 180. Opening the valve 166 permits fluid to flow into the loading chamber 100 and act against a cross-sectional area of the plate to thereby at least partially displace the plate and the cementing plug or dart 105 into the holding chamber 180. The plate may shoulder off against the tapered portion 138 adjacent the lower end 135 of the loading chamber 100, which may prevent full displacement of the cementing plug or dart 105 into the holding chamber 180. Accordingly, in step 740, the valve 166 is closed, fluid supply 478 is disconnected, and in step 745, the loading chamber head 120 is removed, and the plate is removed from the loading chamber 100. In step 750, the loading chamber head 120 is reattached. In step 755, the valve 166 is opened to fully displace the cementing plug or dart 105 into the holding chamber 180. In step 760, the valve 166 is closed and fluid supply 478 is disconnected. In step 765, the loading chamber 100 is detached from the holding chamber 180. In step 770, a holding chamber head 300 is attached to an upper end 145 of the holding chamber 180. In step 775, a fluid supply 178 is connected to holding chamber head 300 such that fluid supply 178 may be used to displace cementing plug or dart 105 from holding chamber 180 into tubular 400. For example, fluid supply 178 may be connected directly to port 310 on holding chamber head 300, and valve 166 may modulate the flow of fluid from fluid supply 178. Alternatively, in certain exemplary embodiments wherein transporting means 474 comprises a hollow pipe, fluid supply 178 may be connected to valve 490 (connection between fluid supply 178 and valve 490 not shown) that is connected to transporting means 474. In step 780, the cap 158 is removed from the lower end 155 of the holding chamber 180. In step 785, the holding chamber 180 is disposed within a tubular 400. In certain exemplary embodiments, an operator may dispose the holding chamber 180 within the tubular 400 through the use of transporting means 474 that has been connected to a lifting device 330 atop the holding chamber head 300, e.g., the operator may connect transporting means 474 to a crane (not shown), then transport holding chamber 180 to the tubular 400 and place the holding chamber 180 into the tubular 400. In certain exemplary embodiments wherein tubular 400 is a cementing head that comprises multiple internal valves, the step of placing the holding chamber 180 into the tubular 400 may comprise introducing the holding chamber 180 through at least one internal valve within the cementing head, and shouldering off atop, or against, an internal valve into which the operator desires to place the cementing plug or dart 105. In certain exemplary embodiments wherein tubular 400 is a cementing head that comprises a plunger assembly capable of individually segregating multiple cementing plugs or darts, the step of placing the holding chamber 180 into the tubular 400 may comprise introducing the holding chamber 180 into the cementing head until it shoulders off on, or against, the plunger. In step 790, the valve 420 is opened to displace the cementing plug or dart 105 into the tubular 400. In step 795, the valve 166 or 490 is closed. In step 800, the holding chamber 180 is removed from the tubular 400. If the operator does not desire to place another cementing plug or dart 105 within tubular 400, the process proceeds to end. In certain exemplary embodiments wherein an operator desires to place multiple cementing plugs or darts 105 within tubular 400, the process may return to step 705, and repeat the process until the desired number of cementing plugs or darts 105 have been placed within tubular 400, after which the process proceeds to end.

Figure 8:
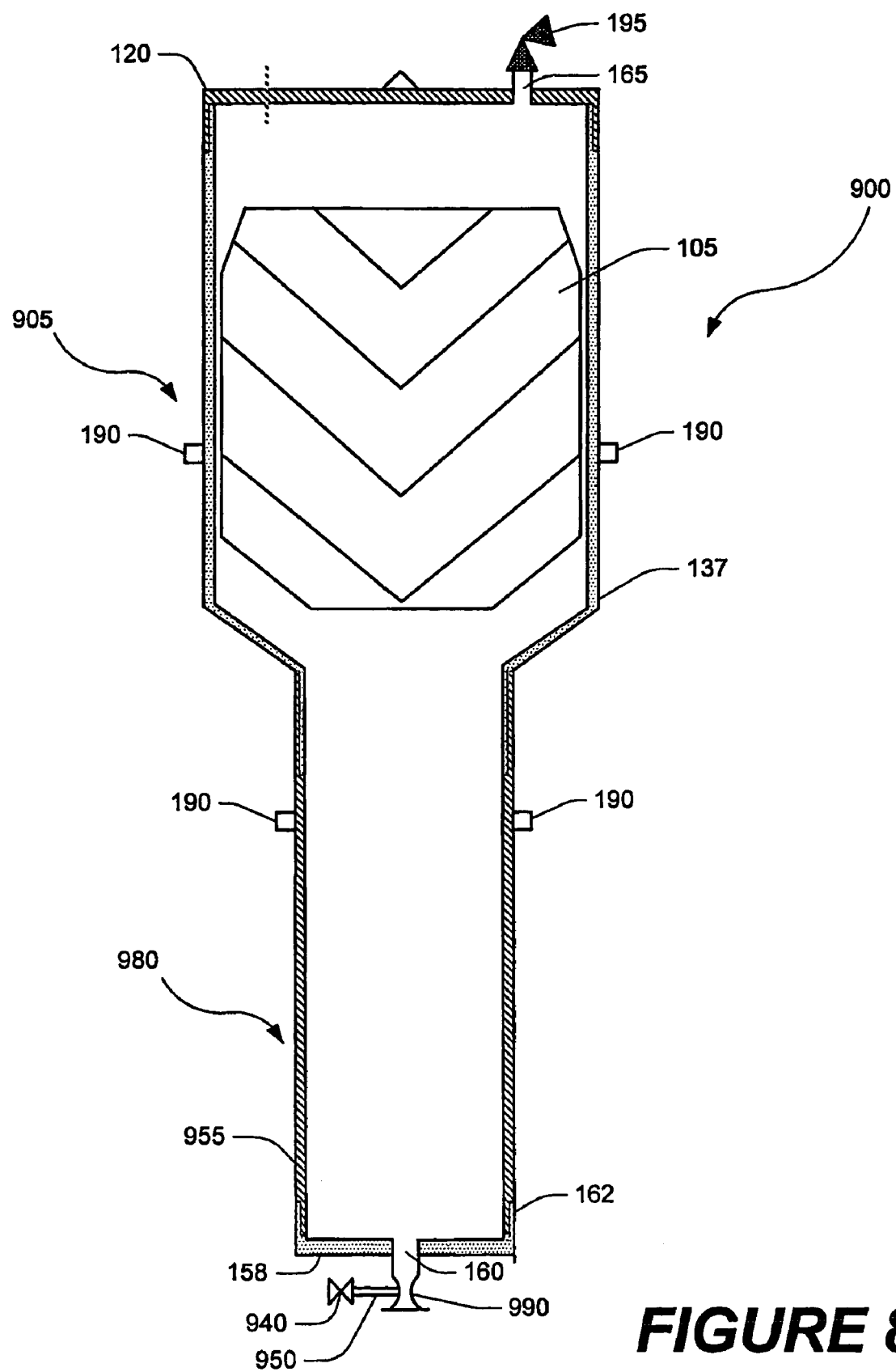
FIG. 8 illustrates yet another exemplary embodiment of an apparatus of the present invention.

FIG. 8 illustrates another exemplary apparatus of the present invention, denoted generally at 900. Apparatus 900 includes a loading chamber 905 and holding chamber 980, and generally resembles the apparatus described with reference to FIG. 1, which previously has been described. Apparatus 900 further comprises eductor 990, located adjacent a lower end 955 of holding chamber 980. Eductor 990 may be any device that is capable of applying a negative pressure to apparatus 900, or to a desired portion of apparatus 900. As referred to herein, the phrase "applying a negative pressure" will be understood to include, inter alia, generating a partial vacuum, or full vacuum, within, e.g., apparatus 900, or a desired portion of apparatus 900. For example, eductor 990 may be any device that can be used to reduce the pressure within holding chamber 980 such that cementing plug or dart 105 may be conveyed from loading chamber 905 into holding chamber 980 over a desired period of time. For example, eductor 990 may comprise a venturi tube configured to accept a fluid supply (e.g., a gas supplied at a pressure in the range of from about 100 psi to about 130 psi) that may pass through the venturi tube and generate the desired reduction in pressure within holding chamber 980. Eductor 990 may be attached to apparatus 900 in a variety of ways. For example, eductor 990 may be in fluid connection with opening 160 of cap 158 that is attached to holding chamber 980. Fluid supply 950 (which may be modulated by valve 940) is connected to eductor 990, and flows through eductor 990 so as to provide a desired vacuum on apparatus 900 and thereby pull cementing plug or dart 105 from loading chamber 905 into holding chamber 980. Optionally, an operator may elect to add one or more stiffening rings 190 to loading chamber 905 and/or holding chamber 980, inter alia, to stiffen these elements against exposure to the vacuum conditions that eductor 990 may generate. Optionally, an operator may elect to add a vacuum relief valve 195 to port 165 on loading chamber head 120, inter alia, to provide additional protection against exposure to the vacuum conditions that eductor 990 may generate.

Figure 9:
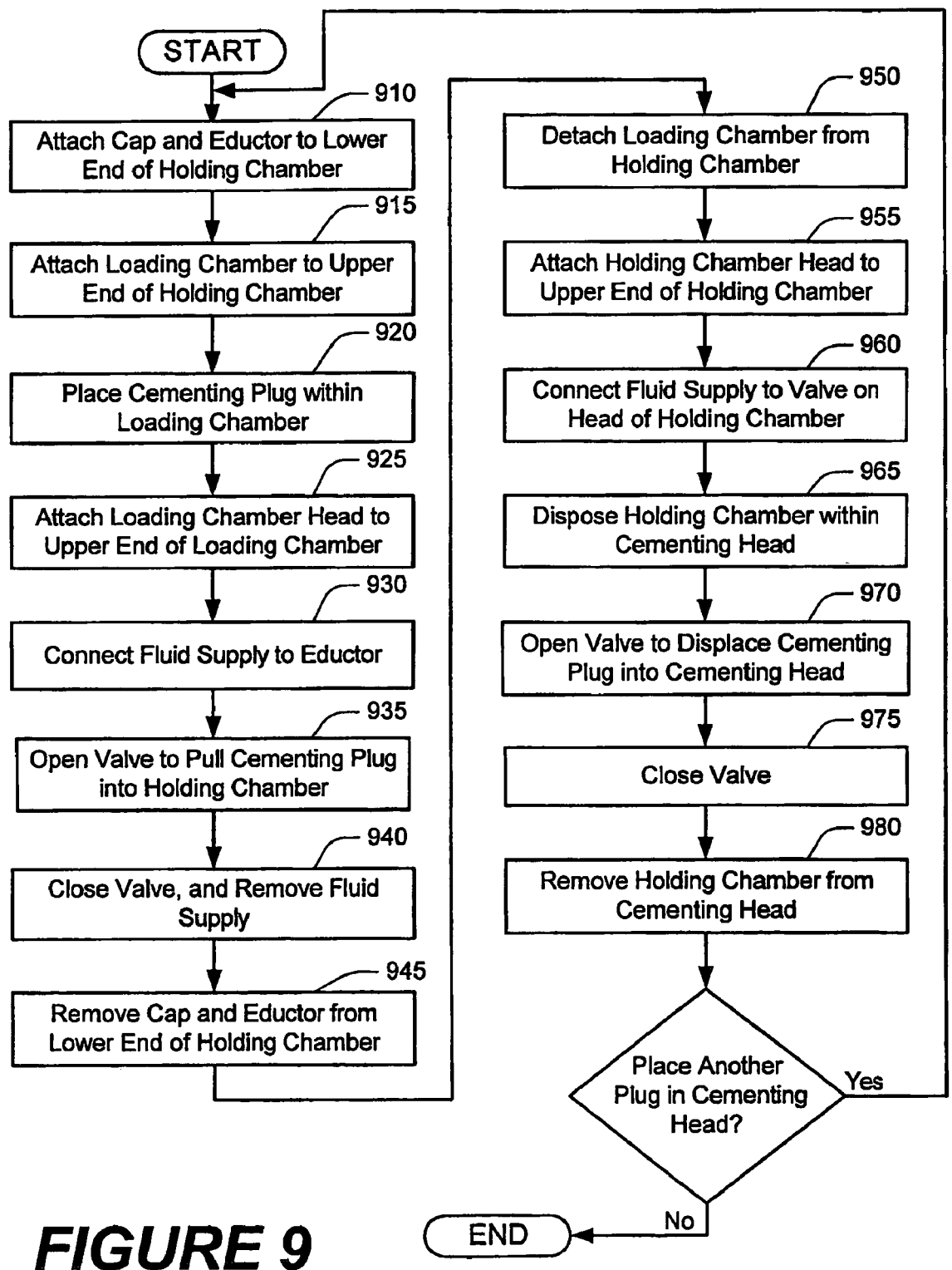
FIG. 9 is a flowchart illustrating another exemplary method of the present invention.

FIG. 9 illustrates an exemplary method of the present invention that may be used, inter alia, in certain exemplary embodiments wherein apparatus 900 is employed. Though FIG. 9 often refers to a cementing plug or dart 105, it will be understood that in certain exemplary embodiments, other compressible objects (e.g., a ball) also may be used in the manner described herein. In step 910, cap 158 and eductor 990 are attached to lower end 955 of holding chamber 980. In step 915, loading chamber 905 is attached to an upper end of holding chamber 980. In step 920, cementing plug or dart 105 is placed within loading chamber 905. In step 925, an operator optionally may attach loading chamber head 120 to an upper end of loading chamber 905. In step 930, fluid supply 950 (which may be modulated by valve 940) may be connected to eductor 990. In step 935, valve 940 may be opened so as to draw fluid from fluid supply 950 and through eductor 990, to thereby pull cementing plug or dart 105 into holding chamber 980. In step 940, valve 940 may be closed, and fluid supply 950 may be disconnected from eductor 990. In step 945, cap 158 and eductor 990 may be disconnected from the lower end 955 of holding chamber 980. In step 950, loading chamber 905 may be detached from holding chamber 980. In step 955, holding chamber head 300 may be attached to an upper end of holding chamber 980. In step 960, a fluid supply 178 is connected to holding chamber head 300 such that fluid supply 178 may be used to displace cementing plug or dart 105 from holding chamber 980 into tubular 400. In step 965, holding chamber 980 may be disposed within tubular 400. In step 970, a valve (e.g., valve 166 or valve 490) may be opened to displace cementing plug or dart 105 into tubular 400. In step 975, valve 166 or 490 may be closed. In step 980, holding chamber 980 may be removed from tubular 400. If the operator does not desire to place another cementing plug or dart 105 within tubular 400, the process proceeds to end. In certain exemplary embodiments wherein an operator desires to place multiple cementing plugs or darts 105 within tubular 400, the process may return to step 705, and repeat the process until the desired number of cementing plugs or darts 105 have been placed within tubular 400, after which the process proceeds to end.

Figure 10:
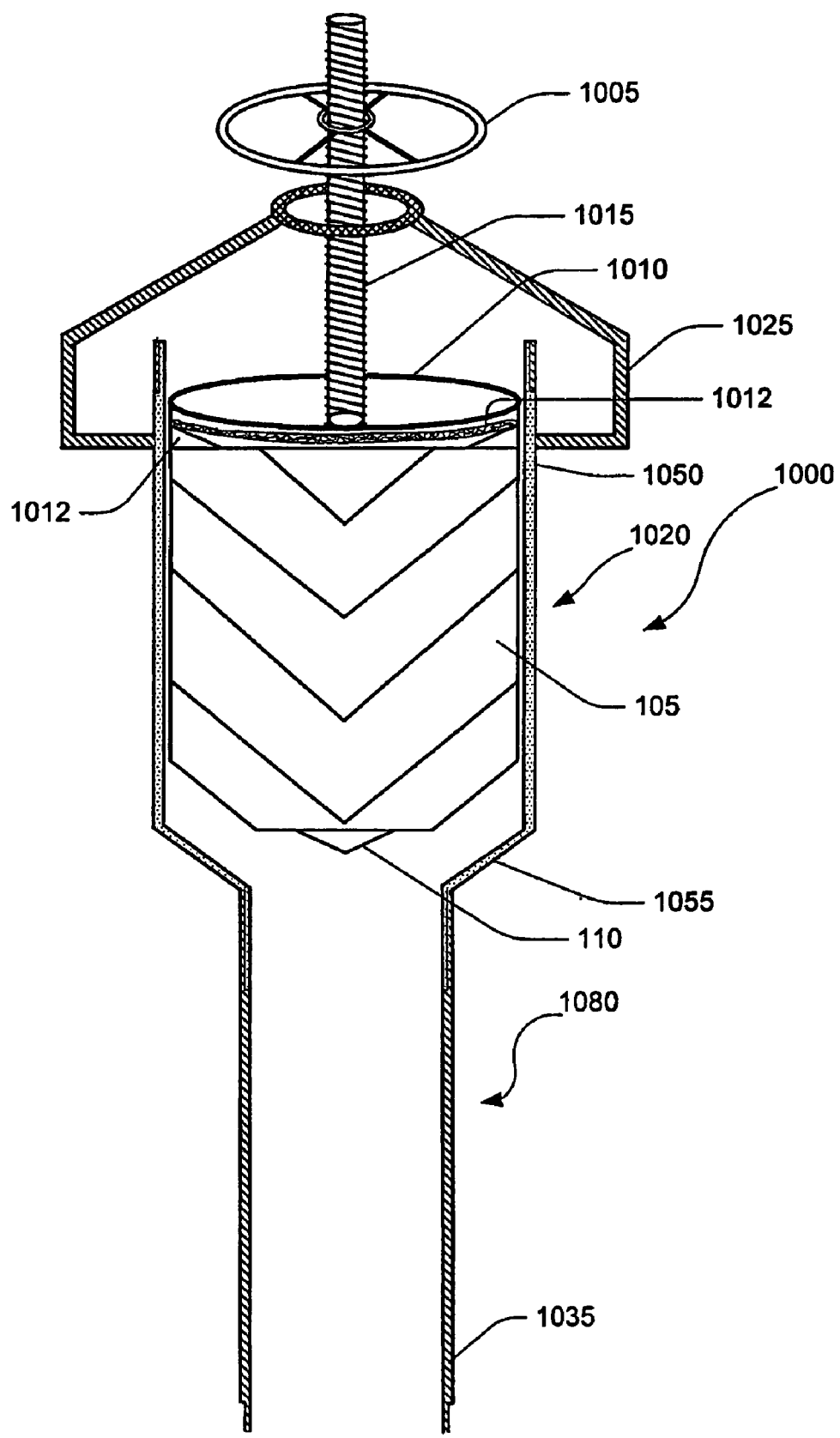
FIG. 10 illustrates yet another exemplary embodiment of an apparatus of the present invention.

FIG. 10 depicts another exemplary apparatus of the present invention, denoted generally at 1000. Apparatus 1000 includes a loading chamber 1020 and holding chamber 1080. Piston 1010 is disposed above cementing plug or dart 105, and may contact cementing plug or dart 105 so as to displace cementing plug or dart 105 from loading chamber 1020 into holding chamber 1080 by any suitable means. FIG. 10 further illustrates an exemplary means by which piston 1010 may be downstroked and upstroked. As illustrated in FIG. 10, handle 1005 is connected via threaded stem 1015 to piston 1010, and may be rotated (e.g., in the clockwise direction) so as to downstroke piston 1010, and also may be rotated (e.g., in the counterclockwise direction) so as to upstroke piston 1010. In certain exemplary embodiments, threaded stem 1015 may have a length that is sufficient to downstroke piston 1010 along the entire length of apparatus 1000, to thereby displace cementing plug or dart 105 from loading chamber 1020 into holding chamber 1080, and (where holding chamber 1080 and loading chamber 1020 are not disconnected before holding chamber 1080 is placed within tubular 400) to thereby displace cementing plug or dart 105 from holding chamber 1080 into tubular 400. In such embodiments, holding chamber 1080 and loading chamber 1020 generally may be permanently connected (e.g., formed as unitary construction, or welded together). In certain exemplary embodiments, threaded stem 1015 may have a length that is sufficient to downstroke piston 1010 until piston 1010 shoulders off amidst tapered portion 1055. In such embodiments, holding chamber 1080 and loading chamber 1020 generally may be impermanently connected (e.g., connected by a threaded connection). In certain exemplary embodiments, including those where cementing plug or dart 105 comprises an open-cell foam, cementing plug or dart 105 may be soaked in liquid, or a layer of liquid 1012 may be placed in the loading chamber 1020 above cementing plug or dart 105. In certain exemplary embodiments, piston 1010 may be surrounded by an o-ring (not shown), which, inter alia, may reduce the potential for liquid to leak past piston 1010 as it travels downward through loading chamber 1020. The o-ring may be made from any suitable elastomeric material.

Figure 11:
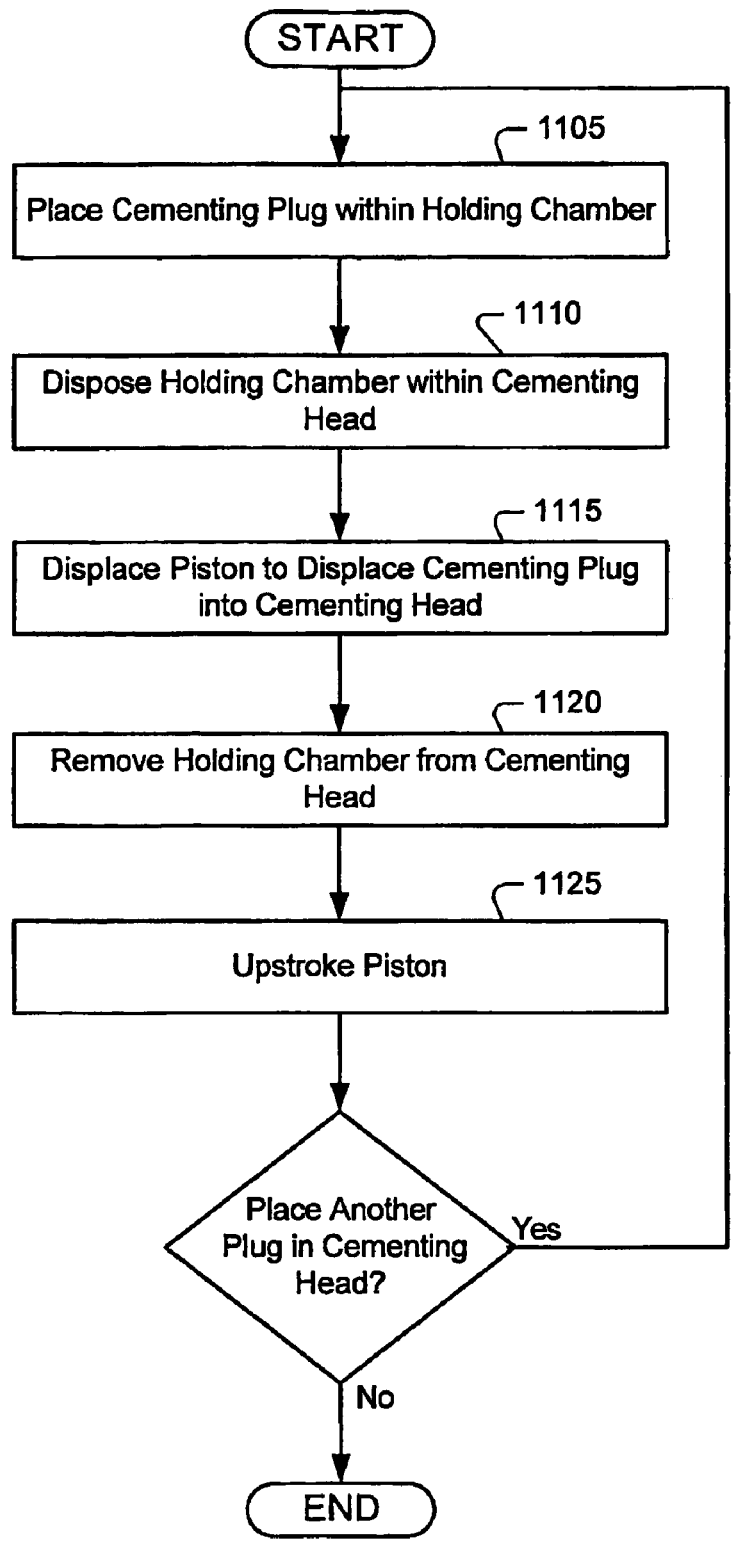
FIG. 11 is a flowchart illustrating another exemplary method of the present invention.

FIG. 11 illustrates an exemplary method of the present invention that may be used, inter alia, in certain exemplary embodiments wherein apparatus 1000 is employed. Though FIG. 11 often refers to a cementing plug or dart 105, it will be understood that in certain exemplary embodiments, other compressible objects (e.g., a ball) also may be used in the manner described herein. In step 1105, cementing plug or dart 105 is placed within apparatus 1000 below piston 1010. In step 1110, apparatus 1000 is placed above tubular 400, such that holding chamber 1080 may be disposed within tubular 400. In step 1115, an operator rotates handle 1005 so as to displace piston 1010 downwardly within apparatus 1000 such that cementing plug or dart 105 is displaced into tubular 400. In step 1120, apparatus 1000 is removed from tubular 400. In step 1125, handle 1005 may be rotated so as to upstroke piston 1010 to a desired position. If the operator does not desire to place another cementing plug or dart 105 within tubular 400, the process proceeds to end. In certain exemplary embodiments wherein an operator desires to place multiple cementing plugs or darts 105 within tubular 400, the process may return to step 1105, and repeat the process until the desired number of cementing plugs or darts 105 have been placed within tubular 400, after which the process proceeds to end.

Figure 12:
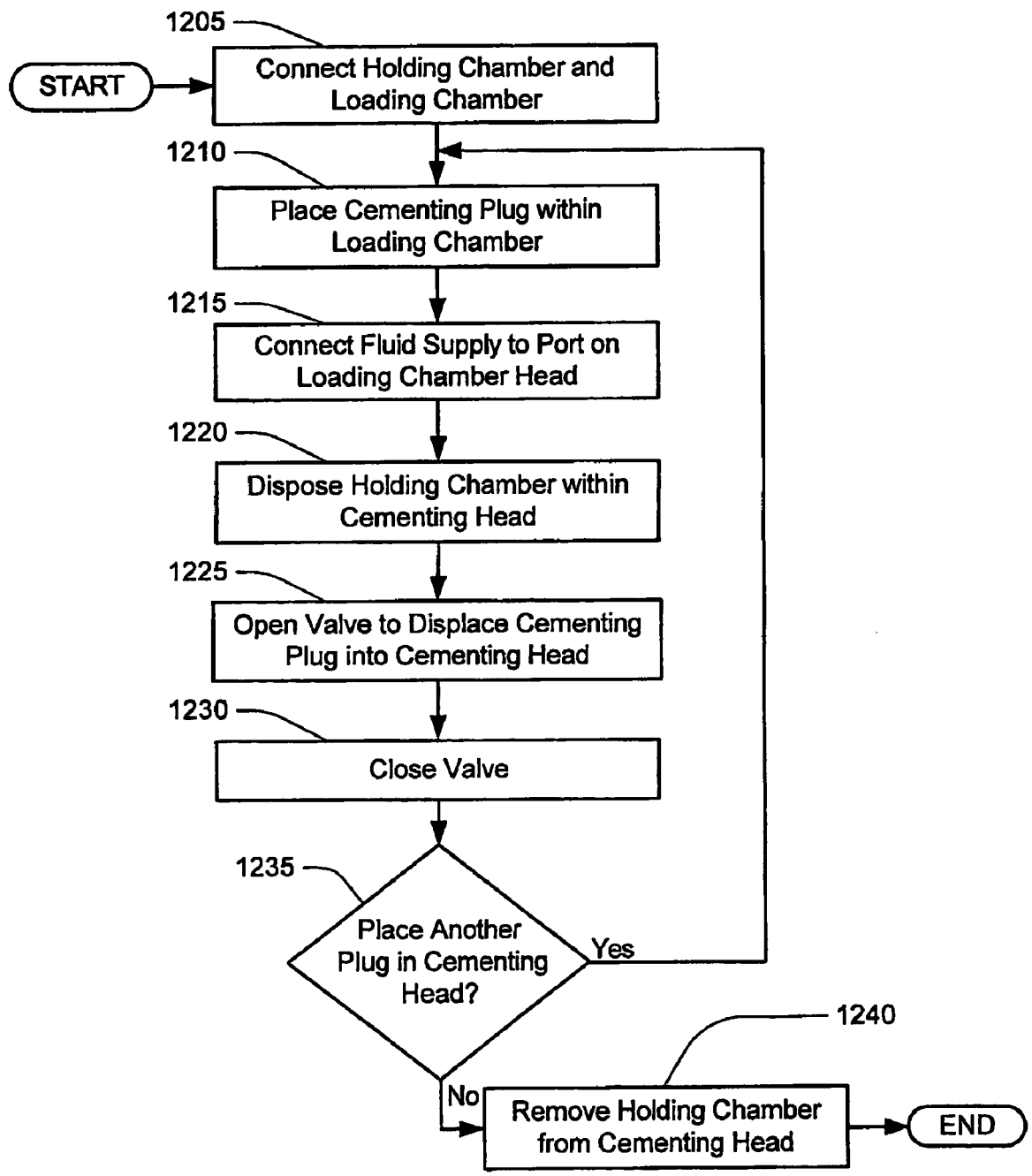
FIG. 12 is a flowchart illustrating another exemplary method of the present invention.

FIG. 12 illustrates an exemplary method of the present invention that may be used, inter alia, when an operator elects not to separate loading chamber 100 and holding chamber 180 from each other following the displacement of cementing plug or dart 105 from loading chamber 100 into holding chamber 180, but elects instead to permit loading chamber 100 to remain connected to holding chamber 180 before lowering holding chamber 180 into tubular 400. Though FIG. 12 often refers to a cementing plug or dart 105, it will be understood that in certain exemplary embodiments, other compressible objects (e.g., a ball) also may be used in the manner described herein. Among other things, such election to permit loading chamber 100 to remain connected to holding chamber 180 before lowering holding chamber 180 into tubular 400 may result in a time savings, inter alia, because of the elimination of the step of disconnecting loading chamber 100 and tapered portion 138 from holding chamber 180 as well as the elimination of the step of attaching holding chamber head 300 to holding chamber 180. In step 1205, holding chamber 180 and loading chamber 100 are connected (if they are not already connected from having been formed of unitary construction or from having been welded together). In step 1210, cementing plug or dart 105 is placed within loading chamber 100. In step 1215, a fluid supply 178 may be connected to a port 165 on the loading chamber head 120. In step 1220, holding chamber 180 is disposed within tubular 400. In step 1225, a valve 166 in fluid connection with fluid supply 178 (or valve 490, in embodiments wherein transporting means 474 comprises hollow pipe through which fluid may be supplied) is opened to displace cementing plug or dart 105 into tubular 400. In step 1230, valve 166 or 490 is closed. In step 1235, the operator determines whether or not to place another cementing plug or dart 105 within tubular 400. If the operator does not desire to place another cementing plug or dart 105 within tubular 400, the process proceeds to step 1240, where holding chamber 180 is removed from tubular 400. From step 1240, the process proceeds to end. In certain exemplary embodiments wherein an operator desires to place multiple cementing plugs or darts 105 within tubular 400, the process may return to step 1210, and may be repeated until the desired number of cementing plugs or darts 105 have been placed within tubular 400, after which the process proceeds to end.

Therefore, the present invention is well adapted to carry out the objects and attain the ends and advantages mentioned as well as those which are inherent therein. While the invention has been depicted and described with reference to exemplary embodiments of the invention, such a reference does not imply a limitation on the invention, and no such limitation is to be inferred. The invention is capable of considerable modification, alternation, and equivalents in form and function, as will occur to those ordinarily skilled in the pertinent arts and having the benefit of this disclosure. The depicted and described embodiments of the invention are exemplary only, and are not exhaustive of the scope of the invention. Consequently, the invention is intended to be limited only by the spirit and scope of the appended claims, giving full cognizance to equivalents in all respects.

What is claimed is:

1. A method of placing a compressible object having a cross-section into a tubular, comprising the steps of:
   providing an apparatus that comprises a loading chamber having a first cross-section and a holding chamber having a second cross-section, wherein:
   the loading chamber is in fluid communication with the holding chamber;
   the first cross-section is greater than the second cross-section; and
   the second cross-section is less than an inside cross-section of the tubular; and
   the compressible object is stored in a compressed state in the holding chamber;
   placing the apparatus in the tubular; and
   releasing the compressible object into the tubular.

2. The method of claim 1, wherein the step of placing the apparatus in the tubular comprises the step of disconnecting the loading chamber from the holding chamber while the compressible object is inside the holding chamber.

3. The method of claim 1 wherein the step of placing the apparatus into the tubular comprises the step of placing the holding chamber within the tubular, while the compressible object is inside the holding chamber.

4. The method of claim 1 wherein the step of releasing the compressible object within the tubular comprises displacing the compressible object from the holding chamber into the tubular.

5. The method of claim 4 wherein the step of displacing the compressible object from the holding chamber into the tubular comprises applying a differential pressure to the compressible object.

6. The method of claim 5 wherein the step of applying a differential pressure to the compressible object comprises the step of applying negative pressure below the compressible object.

7. The method of claim 5 wherein the step of applying a differential pressure to the compressible object comprises the step of applying positive pressure above the compressible object.

8. The method of claim 1 wherein the loading chamber is releasably attached to the holding chamber.

9. The method of claim 1 wherein the compressible object is loaded into the loading chamber and then displaced into the holding chamber by applying a differential pressure to the compressible object.

10. The method of claim 9 wherein the step of applying a differential pressure to the compressible object comprises the step of applying negative pressure below the compressible object.

11. The method of claim 9 wherein the step of applying a differential pressure to the compressible object comprises the step of applying positive pressure above the compressible object.

12. The method of claim 1 wherein the compressible object is a cementing plug.

13. The method of claim 1 wherein the compressible object is a dart.

14. The method of claim 1 wherein the compressible object is a ball.

15. The method of claim 1 further comprising the step of immersing the compressible object in a liquid before the step of reducing the cross-section of the compressible object.

16. The method of claim 1 wherein the tubular is a cementing head.

17. The method of claim 1 wherein the tubular is a pipe string.

18. A method of reducing the cross-section of a compressible object for placement into a tubular, comprising applying a differential pressure to displace the compressible object from within a loading chamber having a first cross-section into a holding chamber having a second cross-section, wherein the loading chamber is in fluid communication with the holding chamber, wherein the first cross-section is greater than the second cross-section, and wherein the second cross-section is less than an inside cross section of the tubular, placing the holding chamber within the tubular, while the compressible object is inside the holding chamber, and releasing the compressible object into the tubular.

19. The method of claim 18 wherein the step of applying a differential pressure to displace the compressible object from within a loading chamber having a first cross-section into a holding chamber having a second cross-section comprises supplying a fluid into the loading chamber so that the fluid acts against a cross-section of the compressible object to thereby displace the compressible object into the loading chamber.

20. The method of claim 18 wherein the step of applying a differential pressure to displace the compressible object from within a loading chamber having a first cross-section into a holding chamber having a second cross-section comprises applying a negative pressure below the compressible object.

21. The method of claim 18 wherein the step of applying a differential pressure to displace the compressible object from within a loading chamber having a first cross-section into a holding chamber having .a second cross-section comprises:
   disposing a piston within the loading chamber; and
   displacing the piston against a cross-section of the compressible object to thereby displace the compressible object into the holding chamber.

22. The method of claim 21 wherein the piston comprises a plate.

23. The method of claim 18 wherein the compressible object is a cementing plug.

24. The method of claim 18 wherein the compressible object is a dart.

25. The method of claim 18 wherein the compressible object is a ball.

26. The method of claim 18 wherein the loading chamber is threadably attached to the holding chamber.

27. The method of claim 18 further comprising the step of immersing the compressible object in a liquid before the step of applying a differential pressure to displace the compressible object from within a loading chamber having a first cross-section into a holding chamber having a second cross-section.

28. The method of claim 18 wherein the tubular is a pipe string or a cementing head.

29. An apparatus for placing a compressible object into a tubular, comprising:
   a loading chamber having an inner cross-section;
   a holding chamber having an inner cross-section, and in fluid communication with the loading chamber;
   a fluid inlet attached to the loading chamber; and
   a fluid outlet attached to the holding chamber;
   wherein the inner cross-section of the holding chamber is less than the inner cross-section of the loading chamber and an inner cross-section of the tubular, and wherein the inner cross-section of the loading chamber is greater than an inner cross-section of the tubular.

30. The apparatus of claim 29, wherein the loading chamber and the holding chamber are connected by a releasable connection.

31. The apparatus of claim 30 wherein the releasable connection comprises a threadable attachment.

32. The apparatus of claim 29 wherein the loading chamber and the holding chamber are adapted to receive a cementing plug, a ball, or a dart.

33. The apparatus of claim 29 further comprising a source of negative pressure connected to a lower end of the holding chamber.

34. The apparatus of claim 33 wherein the source of negative pressure is an eductor.

35. The apparatus of claim 29 further comprising a source of positive pressure connected to an upper end of the loading chamber.

36. The apparatus of claim 35 wherein the source of positive pressure is a fluid supply.

37. The apparatus of claim 29 wherein the tubular is a cementing head.

38. The apparatus of claim 29 wherein the tubular is a pipe string.

39. An apparatus for placing a compressible object into a tubular, comprising:
   a loading chamber having an inner cross-section;
   a holding chamber having an inner cross-section, and in fluid connection with the loading chamber;
   a piston;
   an inlet attached to the loading chamber; and
   an outlet attached to the holding chamber;
   wherein:
      the inner cross-section of the holding chamber is less than the inner cross-section of the loading chamber; and
      the piston is disposed within the apparatus such that it may be raised and lowered within the loading chamber and the holding chamber.

40. The apparatus of claim 39 wherein the compressible object is a ball, a dart, or a cementing plug.

41. The apparatus of claim 39 wherein the tubular is a cementing head.

42. The apparatus of claim 39 wherein the tubular is a pipe string.

* * * * *